(12) United States Patent
Nishi et al.

(10) Patent No.: US 8,454,002 B2
(45) Date of Patent: Jun. 4, 2013

(54) FLUID FILLED VIBRATION DAMPING DEVICE

(75) Inventors: Naoki Nishi, Nagoya (JP); Tetsuya Miyahara, Wako (JP)

(73) Assignees: Tokai Rubber Industries, Ltd., Aichi (JP); Honda Motor Co., Ltd., Tokyo (JP)

( * ) Notice: Subject to any disclaimer, the term of this patent is extended or adjusted under 35 U.S.C. 154(b) by 994 days.

(21) Appl. No.: 12/222,020

(22) Filed: Jul. 31, 2008

(65) Prior Publication Data

US 2009/0038896 A1 Feb. 12, 2009

(30) Foreign Application Priority Data

Aug. 10, 2007 (JP) ................................. 2007-210139

(51) Int. Cl.
*F16F 5/00* (2006.01)
*F16F 9/00* (2006.01)

(52) U.S. Cl.
USPC .............................. 267/140.13; 267/140.11

(58) Field of Classification Search
USPC ............. 267/140.11, 140.12, 140.13, 140.14, 267/140.15; 248/636, 638
See application file for complete search history.

(56) References Cited

U.S. PATENT DOCUMENTS

| | | | |
|---|---|---|---|
| 4,739,978 A | 4/1988 | Bodin | |
| 5,499,799 A * | 3/1996 | Kojima | 267/140.13 |
| 6,557,839 B2 * | 5/2003 | Tanaka | 267/140.13 |
| 7,857,293 B2 * | 12/2010 | Muraoka | 267/140.11 |
| 2005/0258581 A1 * | 11/2005 | Tanaka | 267/140.11 |
| 2006/0043657 A1 * | 3/2006 | Tanaka | 267/140.11 |
| 2007/0075470 A1 | 4/2007 | Happou et al. | |

FOREIGN PATENT DOCUMENTS

| | | |
|---|---|---|
| JP | A-4-203631 | 7/1992 |
| JP | B2-6-105095 | 12/1994 |
| JP | A-2004-251431 | 9/2004 |
| WO | WO 86/03813 A1 | 7/1986 |

OTHER PUBLICATIONS

Search Report issued in European Application No. 08 01 3849 on Aug. 21, 2009.

* cited by examiner

*Primary Examiner* — Melody Burch
(74) *Attorney, Agent, or Firm* — Oliff & Berridge, PLC

(57) ABSTRACT

A fluid filled vibration damping device having an orifice passage formed in a partition member to connect a pressure receiving chamber and an equilibrium chamber, wherein a first end section of the orifice passage extends in along a plane of the partition member, and a communication hole is formed to bend at a right angle from the first end of the orifice passage and open towards the pressure receiving chamber to form a dead water region by orthogonal wall faces of a terminal end face and a bottom face of the orifice passage in a connecting corner section of the orifice passage with the communication hole. A shunt hole of smaller cross-sectional area than the orifice passage and the communication hole is formed in a bottom wall so that the pressure receiving chamber and the equilibrium chamber communicate through the shunt hole in the dead water region.

7 Claims, 7 Drawing Sheets

FLUID FILLED VIBRATION DAMPING DEVICE

INCORPORATED BY REFERENCE

The disclosure of Japanese Patent Application No. 2007-210139 filed on Aug. 10, 2007 including the specification, drawings and abstract is incorporated herein by reference in its entirety.

BACKGROUND OF THE INVENTION

1. Field of the Invention

The present invention relates to a vibration damping device adapted for installation between components which make up a vibration transmission system, to provide vibration-damped coupling and/or vibration-damped support between the components making up the vibration transmission system; and relates in particular to a fluid filled type vibration damping device which utilizes vibration damping action based on the flow effect of a non-compressible fluid filling the interior.

2. Description of the Related Art

There are a number of vibration damping devices known in the art for the purpose of installation between vibration-damped components, such as the power unit and the vehicle body of an automobile for example, in order to provide vibration-damping coupling and/or vibration-damping support between these vibration-damping components. One device of this kind is a fluid filled type vibration damping device the interior of which is filled with non-compressible fluid and which utilizes vibration damping action based on the flow effect of the sealed fluid. One such fluid filled type vibration damping device has a structure in which, for example, a first mounting member is positioned spaced apart from the opening at one axial end of a second mounting member of cylindrical shape, with the first mounting member and the second mounting member elastically coupled together by a main rubber elastic body and with a flexible film disposed so as to cover the opening at the other axial end of the second mounting member, thereby forming in a region to the inner peripheral side of the second mounting member between the opposed faces of the main rubber elastic body and the flexible film a fluid chamber which is isolated from the outside space and which is filled with a non-compressible fluid. A partition member supported by the second mounting member is disposed within the fluid chamber, thereby forming to one side of the partition member in the axial direction a pressure receiving chamber a portion of whose wall is constituted by the main rubber elastic body, and forming to the other side of the partition member in the axial direction an equilibrium chamber a portion of whose wall is constituted by the flexible film. An orifice passage connecting the pressure receiving chamber and the equilibrium chamber together is formed in the partition member.

In this type of fluid filled type vibration damping device, when a load targeted for vibration damping acts across the first mounting member and the second mounting member, internal pressure fluctuations arise in the pressure receiving chamber a portion of whose wall is constituted by the main rubber elastic body, thus giving rise to a pressure differential relative to the equilibrium chamber which readily changes in volume and maintains generally unchanging internal pressure. Fluid flow through the orifice passage between the two chambers is created thereby, and vibration damping action is produced on the basis of the flow effect, e.g. the resonance effect, of the fluid.

A problem with sealed fluid type vibration damping devices of this kind is that noise and vibration sometimes occur when an impulsive load is input across the first mounting member and the second mounting member. Such noise and vibration are attributed to the phenomenon of cavitation due to negative pressure within the pressure receiving chamber in association with input of a large load. Since the problem has an adverse effect on quiet and ride comfort in the passenger cabin, various methods have been sought for resolving the problem.

As a means of solving this problem of cavitation noise, it has been proposed for example to provide a shunt hole through which the pressure receiving chamber and the equilibrium chamber communicate with each other. Specifically, since problematic noise and vibration are created by a drop in pressure within the pressure receiving chamber, by providing a shunt hole through which the pressure receiving chamber and the equilibrium chamber communicate via a shorter passage length than the orifice passage, even in the event that flow of fluid through the orifice passage cannot keep up, fluid will nevertheless be transported from the pressure receiving chamber to the equilibrium chamber through the shunt hole. Negative pressure within the pressure receiving chamber can be rapidly dispelled thereby, and noise and vibration attributed to such negative pressure can be prevented.

However, in a fluid filled type vibration damping device provided with such a shunt hole, there is a risk of a drop in vibration damping capability during input of vibration to be damped. Specifically, since the shunt hole is formed so that it is always open, fluid will be induced to flow through the shunt hole between the pressure receiving chamber and the equilibrium chamber even at times of input of vibration to be damped. Thus, there is a danger that sufficient flow of fluid through the orifice passage will not be achieved, resulting in an appreciable decline in the vibration damping capability of the orifice passage.

To address this problem, there has been proposed for example in US-2007/0075470A1 a fluid filled type vibration damping device having a shunt passage through which the pressure receiving chamber and the equilibrium chamber can communicate with each other via a shorter passage length than the orifice passage, and which is able to switch the opening at the pressure receiving chamber end of the shunt passage between the communicating state and the blocked state by a valve body which is constituted utilizing the main rubber elastic body. With this design, when a large impulsive load that could cause a cavitation problem is input, the valve body will be induced to open so that the shunt passage assumes the communicating state and allows fluid to flow through the shunt passage between the two chambers so that negative pressure within the pressure receiving chamber will be quickly dispelled. On the other hand, when vibration to be damped is input, the shunt passage will be closed off by the valve body, thereby preventing liquid pressure within the pressure receiving chamber from escaping to the equilibrium chamber through the shunt passage, so that fluid flow through the orifice passage can be effectively created and cavitation noise can be reduced or eliminated.

However, in a fluid filled vibration damping device of a structure equipped with a valve body, which is provided for opening and closing the shunt passage such as taught in US-2007/0075470A1, the durability of the valve body will tend to be a problem with repeated operation over an extended period. Furthermore, in some instances, it is exceptionally difficult to tune the operation of the valve body in such a way that it can switch the shunt passage between the communicating state and the blocked state with a high degree of accuracy in response to input of specific vibration. Also, where a special valve body is provided, the problems of an increased number of parts and more complex structure may result. Accordingly, there exists a need for a fluid filled type vibration damping device which affords both effective vibration damping action against vibration to be damped, and reduction or elimination of cavitation noise, through a simple structure with a minimal number of parts.

SUMMARY OF THE INVENTION

It is therefore an object of the present invention to provide a fluid filled type vibration damping device of novel structure which, through a simple structure with a minimal number of parts, will effectively produce the desired vibration damping action during input of vibration to be damped; and that during input of large impulsive load will suppress pressure fluctuations within the pressure receiving chamber and reduce or eliminate noise and vibration attributed to negative pressure within the pressure receiving chamber.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

The principle of the present invention provides a fluid filled type vibration damping device including: a first mounting member; a second mounting member having a tubular section so that the first mounting member is positioned at an opening at a first end of the second mounting member; a main rubber elastic body elastically connecting the first mounting member and the second mounting member together with the opening at the first end of the second mounting member fluid-tightly closed by the main rubber elastic body while an opening at another end of the second mounting member is fluid-tightly closed by a flexible film so as to form between opposed faces of the main rubber elastic body and the flexible film in a region to an inner peripheral side of the second mounting member a fluid chamber which is isolated from an outside space and filled with a non-compressible fluid; a partition member disposed within the fluid chamber while being supported by the second mounting member so as to form to one side of the partition member a pressure receiving chamber whose wall is partially constituted by the main rubber elastic body, and to another side of the partition member an equilibrium chamber whose wall is partially constituted by the flexible film; and an orifice passage formed in the partition member to connect the pressure receiving chamber and the equilibrium chamber together, wherein a first end section of the orifice passage extends in a direction of a plane of extension of the partition member, and a communication hole is formed so as to bend at a right angle from the first end section of the orifice passage and open towards the pressure receiving chamber so that the first end section of the orifice passage communicates with the pressure receiving chamber through the communication hole, wherein at a pressure receiving chamber-side opening section in the orifice passage, a terminal end face of the orifice passage rises up at a right angle with respect to a direction of extension of the orifice passage, in order to form a dead water region by orthogonal wall faces of the terminal end face and a bottom face of the orifice passage in a connecting corner section of the orifice passage with the communication hole; wherein a bottom wall of the first end section of the orifice passage, which constitutes one of the orthogonal wall faces of the dead water region, faces at a first face thereof directly to the pressure receiving chamber through the communication hole, while facing at another face thereof directly to the equilibrium chamber at a portion away from the orifice passage; and wherein a shunt hole of smaller cross-sectional area than the orifice passage and the communication hole is formed in the bottom wall so that the pressure receiving chamber and the equilibrium chamber communicate through the shunt hole in the dead water region of the orifice passage.

In the fluid filled type vibration damping device constructed according to the present invention, the shunt hole is formed in the bottom wall of the orifice passage in the opening section of the orifice passage on its pressure receiving chamber end; and the pressure receiving chamber and the equilibrium chamber communicate through the shunt hole. Thus, when a large impulsive load is input across the first mounting member and the second mounting member, fluid will be induced to flow through the shunt hole between the chambers, thereby preventing excessive pressure fluctuations in the pressure receiving chamber, and reducing or eliminating noise and vibration attributed to the phenomenon of cavitation associated with a drop in pressure in the pressure receiving chamber.

Furthermore, a first end section of the orifice passage extends in the direction of the plane of extension of the partition member, and the communication hole is formed such that the communication hole bends at a right angle from the first end of the orifice passage and opens towards the pressure receiving chamber, thereby forming a dead water region in which fluid pools, in the connecting corner section of the first end section of the orifice passage with the communication hole. Furthermore, the shunt hole is formed so as to open into the dead water region.

When vibration load in the frequency band to which the orifice passage has been tuned is input, active fluid flow will be produced through the orifice passage, whereby the shunt hole which opens into the dead water region will be substantially blocked, preventing the sealed fluid from flowing through the shunt hole between the pressure receiving chamber and the equilibrium chamber. With this arrangement, at times when vibration to be damped is input, sufficient fluid flow through the orifice passage can be created, and vibration damping action can be effectively achieved on the basis of the flow effect of the fluid.

That is, according to the fluid filled type vibration damping device which pertains to the present invention, it is possible to advantageously achieve both satisfactory vibration damping capability at times of normal load input, as well as suppressed cavitation noise at times when large impulsive load is input.

Moreover, in the present invention, switching of the shunt hole between the substantially communicating state and the blocked state is accomplished by forming the shunt hole at a specific location, and skillfully utilizing the flow path during resonance of fluid flowing through the orifice passage. Consequently, according to the present invention the desired vibration damping capability and elimination of cavitation noise mentioned above can be realized with a minimum number of parts and a simple structure, without the need to provide a special part as the valve means.

Structures having a shunt hole formed in part of the wall of the orifice passage have been disclosed in U.S. Pat. No. 4,739, 978 and JP 6-105095 B for example. However, the inventions pertaining to these patent applications have the shunt hole formed in the wall of the orifice passage for the purpose of producing low dynamic spring effect in instances where vibration of a higher frequency than the tuning frequency of the orifice passage is input; and in no way suggest the issue addressed by the present invention, namely, to achieve both reduced cavitation noise at times when a large impulsive impact is input, and effective vibration damping capability at times when vibration to be damped is input, through a simple structure. That is, the inventions pertaining to these patent applications are proposed with the aim of addressing an entirely different issue than the present invention, and thus differ completely from the present invention in terms of inventive concept.

The inventions pertaining to the two prior art publications cited above which differ in fundamental technical concept from the present invention also lack the structure which characterizes the present invention. The characteristic structure of the present invention, which is also lacking in the two prior art publications cited above, will be additionally discussed hereinbelow.

First, in the present invention, the communication hole is formed so as to extend at a right angle from the end section of the orifice passage. In the present invention, by so doing the flow within the orifice passage will easily separate from the wall faces of the orifice passage in the connecting corner of the communication hole and the orifice passage, and a dead water region will be positively formed by the orthogonal wall faces of the lower face and terminal end face of the orifice passage. By skillfully utilizing the dead water region, pressure within the pressure receiving chamber may be effectively prevented from acting directly on the shunt hole, and switching of the shunt hole between the substantially communicating state and the blocked state will be accomplished.

On the other hand, U.S. Pat. No. 4,739,978 teaches a structure in which the end section of the orifice passage on its pressure receiving chamber end (the communication hole) is formed so as to inflect at an obtuse angle towards the pressure receiving chamber end from a first end section of the orifice passage. Where the communication hole and the orifice passage inflect at an obtuse angle in this way, fluid will flow easily along the wall faces within the orifice passage, and it will be difficult to create a dead water region in the connecting corner of the communication hole and the orifice passage.

As will be apparent from the preceding discussion, the fundamental technical concept of the present invention, namely, that of employing a specific structure whereby the communication hole is formed at a right angle to the orifice passage to positively create a dead water region, and of skillfully utilizing the dead water region to effectively prevent pressure within the pressure receiving chamber from acting directly on the shunt hole, is not disclosed in U.S. Pat. No. 4,739,978.

Next, in the present invention, the first face of the bottom wall of the orifice passage in which the shunt hole is formed faces the pressure receiving chamber through the communication hole while the other face lies exposed directly to the equilibrium chamber; and the equilibrium chamber and the communication hole which is the end section of the orifice passage on its pressure receiving chamber end communicate with each other through the shunt hole. With the orifice passage in the resonance state, a first opening of the shunt hole will be substantially blocked by the dead water region while the other opening of the shunt hole will open directly into the equilibrium chamber, which is maintained at generally constant pressure, thereby preventing shunting from the orifice passage. Vibration damping action based on flow effect of fluid flowing through the orifice passage will be consistently exhibited thereby.

In JP 6-105095 B on the other hand, a first opening of the shunt hole opens into the end section of the orifice passage on its pressure receiving chamber end, while the other opening opens into the end section of the orifice passage on its equilibrium chamber end. Medial sections in the lengthwise direction of the orifice passage thereby communicate by the shunt hole, and the essential passage length of the orifice passage varies depending on fluid flow through the shunt hole, creating a low dynamic spring effect when medium- to high-frequency vibration is input.

However, where such a structure in which the orifice passage per se is shunted by a shunt hole is employed, even with the orifice passage in the resonance state, fluid flow through the shunt hole will tend to be produced in a direction along the flow direction of the fluid flowing through the orifice passage. This will pose the problem that the tuning frequency of the orifice passage will vary and the desired vibration damping action will not be effectively achieved.

That is, with the structure taught in JP 6-105095 B, the shunt hole opens into the orifice passage in proximity to both ends thereof, and thus with the orifice passage in the resonance state a relative pressure differential will act on the openings on both sides of the shunt hole. Due to this relative pressure differential, a pressure gradient will be produced in the shunt hole, and fluid flow through the shunt hole will be easily produced. In the present invention on the other hand, with the orifice passage in the resonance state a first opening of the shunt hole will open towards the pressure receiving chamber via the dead water region while the other opening will open directly into the equilibrium chamber. Thus, the relative pressure differential acting on the openings on both sides of the shunt hole will be suppressed, and fluid flow through the shunt hole will be effectively prevented.

Accordingly, with the invention disclosed in JP 6-105095 B, due to formation of the shunt hole it is difficult to consistently achieve the essential vibration damping action of the fluid filled type vibration damping device, and even assuming that a reduction in cavitation noise is achieved it will be difficult to achieve this in concomitantly with the desired vibration damping capability. The present invention has as an object to achieve both reduced cavitation noise and the essential vibration damping action of a vibration damping device, and as such is based on a different concept from the invention disclosed in JP 6-105095 B.

According to one preferred form of the fluid filled type vibration damping device of the present invention, in the bottom wall in the first end section of the orifice passage which makes up the orthogonal wall faces of the dead water region, the center axis of the shunt hole is positioned between the terminal end face and the lengthwise center of the orifice passage within the projected area of the communication hole in a direction of the center axis thereof.

With this arrangement, the shunt hole will be formed at a location between the terminal end face and the lengthwise center of the orifice passage within the projected area of the communication hole in the direction of the center axis thereof, whereby the shunt hole opening on the pressure receiving chamber side will consistently open into the dead water region created by the orthogonal wall faces of the terminal end face of the bottom face. Accordingly, pressure in the pressure receiving chamber can be advantageously prevented from acting directly on the shunt hole.

According to one preferred form of the fluid filled type vibration damping device of the present invention, the orifice passage is formed so as to extend a length equivalent to an entire circumference thereof or less in the circumferential direction of the outside peripheral section of the partition member; and at a first circumferential end section of the orifice passage, the communication hole is formed so as to pass through the wall of the orifice passage on its pressure receiving chamber side and the shunt hole may be formed so as to pass through the wall of the orifice passage on its equilibrium chamber side. By such a structure in accordance with the present invention, it will be possible to have a high degree of freedom in setting the length of the orifice passage, and to effectively achieve both the desired vibration damping capability and reduced cavitation noise.

According to another preferred form of the fluid filled type vibration damping device which pertains to the present invention, wherein an upper tier peripheral groove is provided so as to extend through an outside peripheral section of the partition member by a distance equivalent to an entire circumference thereof or less in the circumferential direction, the upper tier peripheral groove being formed with the communication hole passing through a wall on a pressure receiving chamber side in a first circumferential end section of the upper tier peripheral groove and, while being formed with a communication recess opening towards an equilibrium chamber side in a wall on the equilibrium chamber side in the first circumferential end section of the upper tier peripheral groove to reduce a wall thickness on the equilibrium chamber side to form the shunt hole at this location, and wherein a lower tier peripheral groove is formed in an area closer towards the equilibrium chamber side from the upper tier peripheral groove in the outside peripheral section of the partition member, and the lower tier peripheral groove makes a U-turn at another circumferential end section of the upper tier peripheral groove and extends in the circumferential direction through an area equivalent to an entire circumference thereof or less in the circumferential direction away from an area where the communication recess has been formed, with an end section of the lower tier peripheral groove communicating with the equilibrium chamber so that the upper tier peripheral groove and the lower tier peripheral groove form the orifice passage.

By adopting such a structure, the present invention can be implemented in a fluid filled type vibration damping device furnished with an orifice passage having at least two stages above and below; and both vibration damping capability during times of normal vibration input, as well as reduction or elimination of cavitation noise and vibration during times of impulsive load input as discussed above, can be achieved. Moreover, the wall thickness of the orifice passage in the section where the shunt hole is formed can be reduced by the communication recess, thus preventing the partition member from having greater mass than necessary as well as shortening the passage length of the shunt hole so as to be able to rapidly dispel excessive pressure fluctuations within the pressure receiving chamber.

Additionally, by forming the orifice passage in the outside peripheral section of the partition member it becomes possible to situate a liquid pressure absorption mechanism involving a moveable film or moveable plate in the center section of the partition member.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
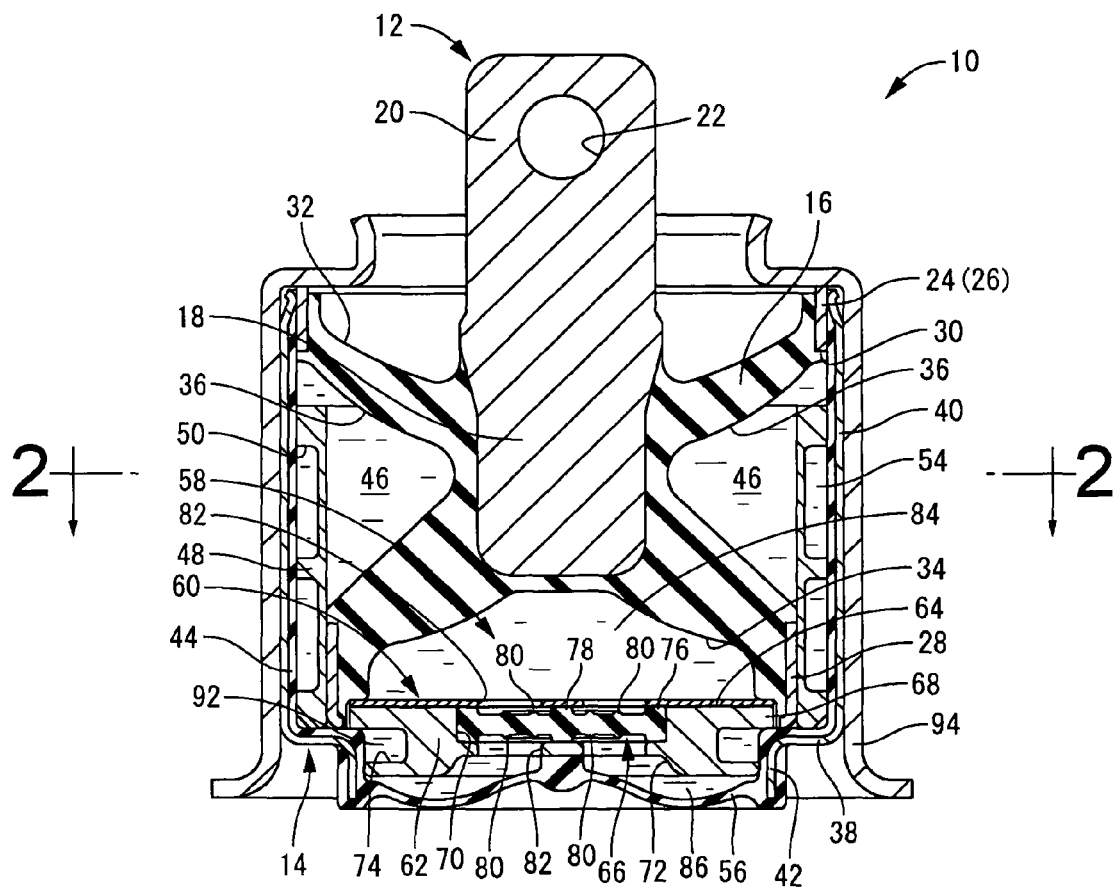
FIG. 1 is an elevational view in vertical cross section of a fluid filled type vibration damping device in the form of an automotive engine mount of construction according to a first embodiment of the present invention, taken along line 1-1 of FIG. 2.
Figure 2:
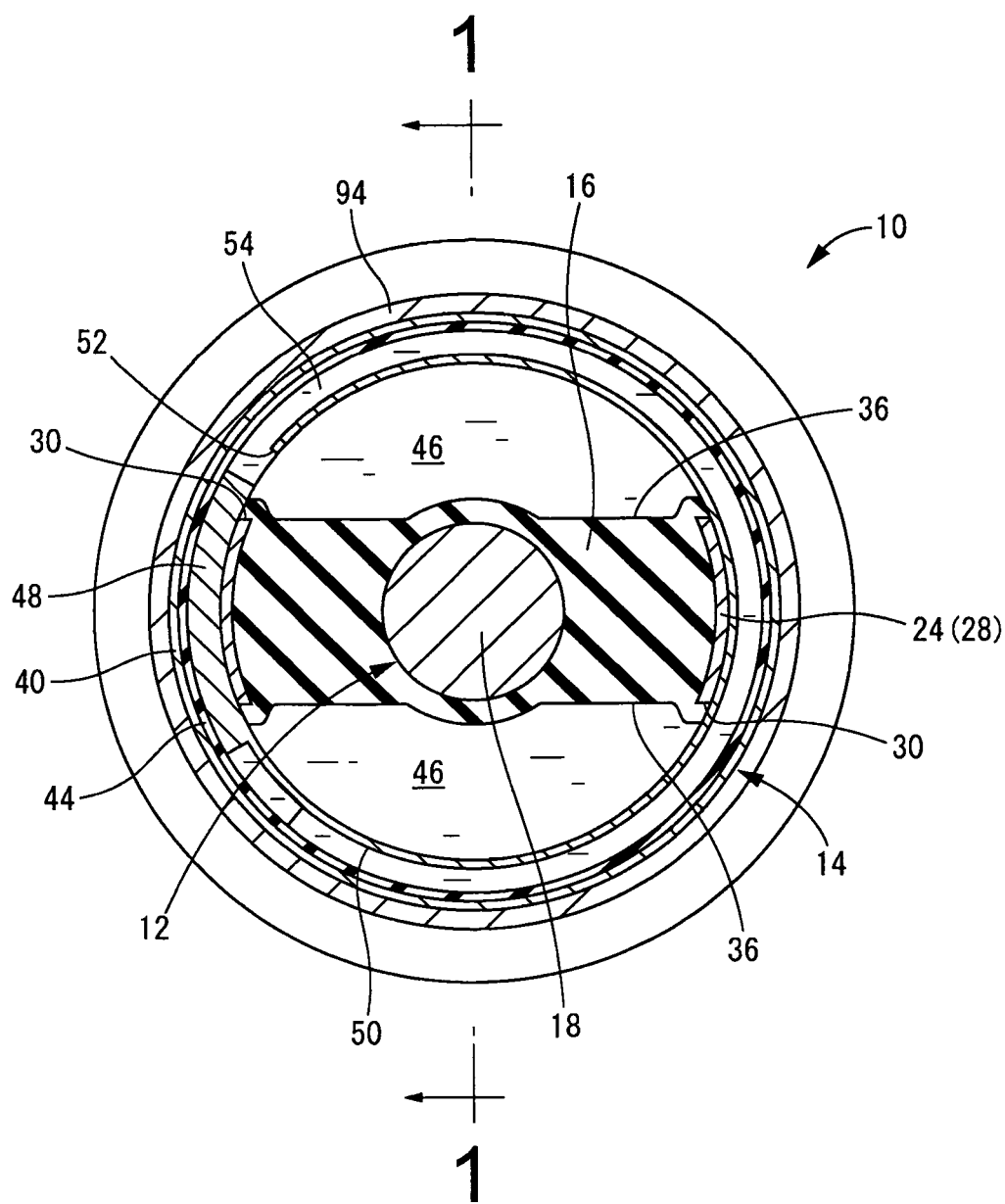
FIG. 2 is a cross sectional view taken along line 2-2 of FIG. 1.

First, FIG. 1 and FIG. 2 depict an automotive engine mount 10 according to a first embodiment of a fluid filled type vibration damping device of the present invention. This automotive engine mount 10 has a structure in which a first mounting member 12 of metal is situated in proximity to and spaced apart from the opening at the axial upper end of a second mounting member 14 of metal, with the first and second mounting members 12, 14 elastically connected together by a main rubber elastic body 16. In the description herein, the vertical direction shall as general rule refer to the vertical direction in FIG. 1, which is also the axial direction of the second mounting member 14.

To describe in greater detail, the first mounting member 12 has solid, small-diameter rod contours extending in a straight line, and is fabricated of high rigidity material such as iron or aluminum alloy. The first mounting member 12 has a structure with an integrally formed mounting portion 20 of tabular contours projecting upward from the upper end of a fastening portion 18 which has a circular cross section and which extends in the axial direction. At the upper end section of the mounting portion 20 there is formed a circular bolt passage hole 22 which passes through the mounting portion 20 in its thickness direction. The first mounting member 12 is one example of the first mounting member. It would also be possible to employ, for example, a first mounting member of a structure having an integrally formed mounting bolt which projects upward from the upper end of the fastening portion 18.

An intermediate sleeve 24 is positioned to the outer peripheral side of the first mounting member 12. The intermediate sleeve 24 has generally tubular contours with a thin wall and large diameter. In the present embodiment, it is fabricated of metal material such as iron, aluminum alloy or the like. While not shown explicitly in the drawing, a shoulder portion is formed in the axial medial section of the intermediate sleeve 24. The upper section to one side of the shoulder portion in the intermediate sleeve 24 constitutes a large-diameter portion 26, while the lower section constitutes a small-diameter portion 28, giving the intermediate sleeve 24 a shouldered round tube shape overall. A pair of windows 30, 30 are formed in the axial medial section of the intermediate sleeve 24. The windows 30 are respectively formed in sections facing one another on an axis lying in the diametrical direction and pass through the peripheral wall of the intermediate sleeve 24. In the present embodiment, the windows 30 are formed so as to open with a length just short of halfway around the circumference. Also, in the present embodiment the windows 30 are formed straddling the shoulder portion, with the upper edges of the windows 30 extending into the large-diameter portion 26 and the lower edges extending into the small-diameter portion 28.

The first mounting member 12 is positioned on the same center axis as the intermediate sleeve 24, and the fastening portion 18 is inserted into the intermediate sleeve 24 from the opening on the upper end. By so doing, the first mounting member 12 is positioned with the fastening portion 18 spaced apart to the inner peripheral side of the intermediate sleeve 24 by a prescribed distance in the diametrical direction and with the mounting portion 20 projecting upward from the intermediate sleeve 24.

With the first mounting member 12 and the intermediate sleeve 24 positioned spaced apart in the diametrical direction, the main rubber elastic body 16 is interposed between them so that the first mounting member 12 and the intermediate sleeve 24 are linked together by the main rubber elastic body 16. The main rubber elastic body 16 has a thick-walled, generally circular block shape overall. With the fastening portion 18 of the first mounting member 12 inserted into the main rubber elastic body 16 so as to extend along its center axis, the first mounting member 12 is vulcanization bonded to the upper end section of the main rubber elastic body 16; and the inside peripheral face of the intermediate sleeve 24 is juxtaposed against and vulcanization bonded to the outside peripheral face of the main rubber elastic body 16. That is, in this embodiment the main rubber elastic body 16 is constituted as an integrally vulcanization molded component which incorporates the first mounting member 12 and the intermediate sleeve 24.

A hollow portion 32 which opens upward is formed at the upper end of the main rubber elastic body 16. This hollow portion 32 takes the form of a recess which opens upward and increases in depth in the axial direction moving towards the center in the diametrical direction. By forming this hollow portion 32, the upper end face of the main rubber elastic body 16 is constituted as a tapered face which slopes down towards the center in the diametrical direction. Furthermore, a circular recess 34 which opens downward is formed on the lower end of the main rubber elastic body 16. The circular recess 34 has a generally inverted bowl shape which gradually increases in diameter towards its opening.

Additionally, a pair of pocket portions 36, 36 are formed in the main rubber elastic body 16. The pocket portions 36, 36 are formed at facing locations to either side of the fastening portion 18 of the first mounting member 12 on an axis lying in the diametrical direction, and open onto the outside peripheral face of the main rubber elastic body 16. The pocket portions 36, 36 are respectively formed with flared contours whose opening width in the axial direction increases gradually towards the outer peripheral side; they extend for length just short of one-half the distance around the circumference and open onto the outside peripheral face through the pair of windows 30, 30 which have been formed in the intermediate sleeve 24. In the present embodiment, the axial upper wall of the pocket portions 36 constituted by the main rubber elastic body 16 are thinner than the axial lower wall.

The second mounting member 14 fits together with the integrally vulcanization molded component of the main rubber elastic body 16. The second mounting member 14 has a generally shouldered, round tubular shape overall with a thin wall and large diameter; the axial upper side of a shoulder portion 38 constitutes a large-diameter tube section 40, while the axial lower side constitutes a small-diameter tube section 42. The inside peripheral face of the second mounting member 14 is covered substantially entirely by a seal rubber layer 44 formed from a thin rubber elastic body. Then, with the integrally vulcanization molded component of the main rubber elastic body 16 inserted into the large-diameter tube section 40 of the second mounting member 14, the second mounting member 14 will be subjected to a diameter reduction process such as 360-degree radial compression or eight-dies using drawing to externally fasten the second mounting member 14 about the intermediate sleeve 24. By juxtaposing the intermediate sleeve 24 against the shoulder portion 38 of the second mounting member 14 from above, the integrally vulcanization molded component of the main rubber elastic body 16 will be positioned in the axial direction with respect to the second mounting member 14.

By assembling the second mounting member 14 with the integrally vulcanization molded component of the main rubber elastic body 16 in this way, the openings of the pocket portions 36, 36 which open onto the outside peripheral face of the main rubber elastic body 16 will be blocked off fluidtightly by the second mounting member 14. By so doing the pair of pocket portions 36, 36 may be utilized to form a pair of liquid chambers 46, 46 filled with non-compressible fluid and situated in opposition on an axis lying in the diametrical direction. The non-compressible fluid which fills the liquid chambers 46, 46 is not limited in any particular way; water, an alkylene glycol, a polyalkylene glycol, silicone oil, a mixture of these, or the like may be favorably employed. However, in order to advantageously achieve vibration damping action based on the flow effect of fluid (discussed later) it is preferable to use a low-viscosity fluid having viscosity of 0.1 Pa·s or lower. Sealing of the fluid within the liquid chambers 46, 46 may be accomplished advantageously, for example, by attaching the second mounting member 14 to the intermediate sleeve 24 while they are submerged in the non-compressible fluid. In the present embodiment, part of the wall of each of the pair of liquid chambers 46, 46 is constituted by the main rubber elastic body 16, and at time of load input the internal pressure fluctuations act in the axis-perpendicular direction.

An orifice member 48 is fitted between the diametrically opposing faces of the second mounting member 14 and the small-diameter portion 28 of the intermediate sleeve 24. As shown in FIGS. 1 and 2, the orifice member 48 has a large-diameter round tube shape overall, and is fabricated of metal material such as iron or aluminum alloy, or hard synthetic resin material. Grooves spaced vertically apart and respectively extending for a length just short of once around the circumference are formed in the orifice member 48 in the circumferential direction; these grooves connect to one another at one circumferential end to form a first peripheral groove 50 which extends for a distance just short of twice around the circumference.

The orifice member 48 is also positioned between the diametrically opposing faces of the intermediate sleeve 24 and the second mounting member 14, in an area lying axially between the shoulder portion of the intermediate sleeve 24 and the shoulder portion 38 of the second mounting member 14. When positioned in this way, the outside peripheral face of the orifice member 48 will be in intimate contact against the second mounting member 14 via the seal rubber layer 44, and the opening of the first peripheral groove 50 will be covered fluidtightly by the second mounting member 14. A first end of the first peripheral groove 50 communicates with one of the liquid chambers 46 via a communication passage 52 while the other end communicates with the other liquid chamber 46 via a communication passage, not shown. Thus, utilizing the first peripheral groove 50, there is formed a choke passage 54 for interconnecting the pair of liquid chambers 46, 46. In the present embodiment, the choke passage 54 is tuned in such a way that vibration damping action based on fluid flow effect will be effectively produced when vibration load which corresponds to engine shake is input in the axis-perpendicular direction.

The upper end opening of the second mounting member 14 is fluid-tightly closed off by the main rubber elastic body 16, while a diaphragm 56 constituting the flexible film is affixed to the bottom end of the second mounting member 14. The diaphragm 56 is formed of a rubber film having thin, generally circular disk shape, and has sufficient slack permitting it to easily undergo elastic deformation. The diaphragm 56 in the present embodiment is thick in its diametrical center section. The diaphragm 56 is vulcanization bonded to the small-diameter tube section 42 which has been provided at the lower end of the second mounting member 14, and the lower end opening of the second mounting member 14 is fluid-tightly blocked off by the diaphragm 56. In the present embodiment, the diaphragm 56 is integrally formed with the seal rubber layer 44 which has been formed covering the inside peripheral face of the second mounting member 14. Moreover, in the present embodiment, the diaphragm 56 has been vulcanization bonded directly to the second mounting member 14; however, it would be acceptable instead to arrange the diaphragm 56 so as to cover the lower end of the second mounting member 14, for example, by vulcanization bonding the outside peripheral face of the diaphragm 56 to the inside peripheral face of a fastener fitting of generally annular shape and then attaching and fastening the fastener fitting to the lower end of the second mounting member 14.

By fluid-tightly blocking off the upper end opening of the second mounting member 14 by the main rubber elastic body 16 and fluid-tightly blocking off the lower end opening of the second mounting member 14 by the diaphragm 56, there is formed in an area to the inner peripheral side of the second mounting member 14 a fluid chamber 58 which is situated between the axially opposing faces of the main rubber elastic body 16 and the diaphragm 56 and which is isolated from the outside space and from the pair of liquid chambers 46, 46. This fluid chamber 58 is filled with a fluid similar to the non-compressible fluid which fills the pair of liquid chambers 46, 46. Filling the fluid chamber 58 with the non-compressible fluid can be accomplished easily, for example, by attaching and fastening the integrally vulcanization molded component of the diaphragm 56 equipped with the second mounting member 14 to the integrally vulcanization molded component of the main rubber elastic body 16 equipped with the intermediate sleeve 24, while these components are immersed in a tank filled with the non-compressible fluid.

Additionally, a partition member 60 is positioned accommodated in the fluid chamber 58. As shown in FIGS. 3 through 7, the partition member 60 has a thick, generally circular disk shape overall, and is furnished with a partition member body 62, a cover fitting 64, and a moveable rubber plate 66.

The partition member body 62 has a thick, generally circular disk shape, and in the present embodiment is fabricated of high rigidity metal material such as iron or aluminum alloy. The partition member body 62 may also be formed from hard synthetic resin or the like. At the upper end section of the partition member body 62 is integrally formed an abutting support portion 68 which projects diametrically outward beyond the outside peripheral face. In the diametrical center section of the partition member body 62 are respectively formed a circular housing recess 70 which opens onto the upper end face, and a circular center recess 72 which opens onto the lower end face. A second peripheral groove 74 is formed on the outside peripheral edge of the partition member body 62. The second peripheral groove 74 is formed so as to open onto the outside peripheral face of the partition member body 62, below the abutting support portion 68. In the present embodiment, the second peripheral groove 74 is formed so as to extend for a length just short of once around the circumference in the circumferential direction, with a generally unchanging cross section.

The cover fitting 64 has a thin, generally circular disk shape, and like the partition member body 62 is fabricated of high rigidity metal material such as iron or aluminum alloy. The cover fitting 64 is juxtaposed against the upper end face of the partition member body 62. While not shown in the drawing, the partition member body 62 and the cover fitting 64 may be mated and fastened by providing a mating mechanism, for example, one which involves mating of mating portions projected from the upper end face of the partition member body 62 with mating holes formed in the cover fitting 64; or by adhesively fastening the cover fitting 64 to the partition member body 62 using an adhesive for example.

By juxtaposing the partition member body 62 and the cover fitting 64 in this way, the opening of the housing recess 70 which has been formed in the partition member body 62 will be covered by the cover fitting 64. Utilizing the housing recess 70, a housing area is thereby formed between the opposing faces of the partition member body 62 and the cover fitting 64.

A moveable rubber plate 66 which serves as the moveable member is arranged within this housing area. The moveable rubber plate 66 is formed by a rubber elastic body having generally circular disk shape. An outside peripheral support portion 76 of annular shape which projects to either side in the axial direction is integrally formed at the diametrical outside peripheral edge, and a center support portion 78 which projects to either side in the axial direction is integrally formed in the diametrical center portion, so that the component is thicker at its outside peripheral edge and center portions than at its diametrically medial section. Cushioning striker portions 80 which project to either side in the axial direction are integrally formed in the diametrically medial section of the moveable rubber plate 66. The cushioning striker portions 80 are ribs which extend continuously about the entire circumference and which have lower projecting height than the outside peripheral support portion 76 and the center support portion 78. In the present embodiment in particular, the cushioning striker portions 80 have a cross section which gradually constricts in width towards the projecting distal end; and two cushioning striker portions 80 are formed spaced apart in the diametrical direction.

By fitting the moveable rubber plate 66 inside the housing recess 70 and juxtaposing the partition member body 62 and the cover fitting 64 in the axial direction, the outside peripheral support portion 76 and the center support portion 78 will be respectively supported clamped between the opposing faces of the partition member body 62 and the cover fitting 64, and the moveable rubber plate 66 will be positioned housed within the housing area. The entire diametrically medial section of the moveable rubber plate 66, including the locations where the cushioning striker portions 80 are formed, is offset from both the partition member body 62 and the cover fitting 64.

Several through-holes 82 are formed respectively in the upper wall and lower wall (top and bottom walls) of the housing area. As shown in FIGS. 3 through 7, the through-holes 82 respectively extend a prescribed length in the circumferential direction and are formed adjacently and spaced apart by a prescribed distance in the circumferential direction. A thin-walled section which has been formed diametrically between the outside peripheral support portion 76 and the center support portion 78 of the moveable rubber plate 66 lies exposed to the outside through the through-holes 82. In the present embodiment, the through-holes 82 consist of four holes each having a cross section which extends in the circumferential direction by a prescribed length approximately just short of one-fourth of the circumference, and are separated from one another in the circumferential direction by "arm" sections of the upper wall and lower wall which extend in four directions from the diametrical center.

The partition member 60 having the above structure is arranged housed within the fluid chamber 58. Specifically, the partition member 60 is inserted into the second mounting member 14 from its upper opening, and the abutting support portion 68 is juxtaposed against the shoulder portion 38 of the second mounting member 14. The partition member 60 is thereby positioned in the axial direction with respect to the second mounting member 14; the upper end of the partition member body 62 and the cover fitting 64 are positioned to the inner peripheral side of and spaced apart from the large-diameter tube section 40 of the second mounting member 14. The lower part of the partition member body 62 is inserted to the inner peripheral side of the small-diameter tube section 42. The orifice member 48 and the integrally vulcanization molded component of the main rubber elastic body 16 are then inserted into the second mounting member 14 from its upper opening, and the second mounting member 14 is subjected to a diameter reduction process such as 360-degree radial compression in order to securely support the partition member 60 on the second mounting member 14, and position it so as to extend in the axis-perpendicular within the fluid chamber 58.

By positioning the partition member 60 so that it extends in the axis-perpendicular direction within the fluid chamber 58 in this way the fluid chamber 58 will be bifurcated to either side of the partition member 60, thereby forming to one side of the partition member 60 a pressure receiving chamber 84 a portion of whose wall is constituted by the main rubber elastic body 16, and forming to the other side an equilibrium chamber 86 a portion of whose wall is constituted by the diaphragm 56. In the present embodiment, the circular recess 34 which has been disposed so as to open onto the large-diameter end face of the main rubber elastic body 16 is utilized in forming the pressure receiving chamber 84; and through the center recess 72 which has been formed so as to open downward at the lower end center section of the partition member body 62, the equilibrium chamber 86 has been formed with ample volume.

When the partition member 60 is attached to the second mounting member 14, the outside peripheral section of the partition member body 62 will be juxtaposed fluidtightly against the second mounting member 14 via the seal rubber layer 44, and the outside peripheral opening of the second peripheral groove 74 which has been formed on the partition member body 62 will be covered fluidtightly by the second mounting member 14.

A communication hole 88 is formed at a first end of the second peripheral groove 74. This communication hole 88 has a generally unchanging cross section and extends upward in a straight line in the axial direction through the partition member body 62 and the cover fitting 64. At the first end of the second peripheral groove 74, it then connects at a right angle with the second peripheral groove 74 which extends in the circumferential direction. Additionally, at the other end of the second peripheral groove 74 there is formed a communication portion 90 which extends in a straight line axially downward through the partition member body 62.

Utilizing the second peripheral groove 74, the communication hole 88, and the communication portion 90, an orifice passage 92 through which the pressure receiving chamber 84 and the equilibrium chamber 86 communicate with each other is thereby formed in the partition member 60. This orifice passage 92, in the lengthwise medial section thereof which has been formed utilizing the second peripheral groove 74, extends in the circumferential direction through an axis-perpendicular plane which is the plane of extension of the partition member 60.

The first end of the orifice passage 92 which has been formed utilizing the communication hole 88 forms a right angle with respect to the medial section and extends axially upward towards the pressure receiving chamber 84 side to communicate with the pressure receiving chamber 84. The first circumferential end face of the orifice passage 92 is constituted as a terminal end face 93 which rises up at a right angle with respect to the bottom wall of the orifice passage 92. In the present embodiment in particular, the terminal end face 93 extends in the axial direction and diametrical direction of the partition member 60, and is generally orthogonal with respect to the lengthwise direction of the orifice passage 92, which extends in the circumferential direction. The terminal end face 93 may extend in any direction orthogonal to the lengthwise direction of the orifice passage; for example, where the vicinity of the end of the orifice passage on the pressure receiving chamber 84 side extends in the diametrical direction, the terminal end face 93 may extend in a direction orthogonal to this diametrical direction. The other end which has been formed utilizing the communication portion 90 forms a right angle with respect to the medial section and extends axially downward towards the equilibrium chamber 86 side to communicate with the equilibrium chamber 86.

In the present embodiment, the orifice passage 92 is tuned so as to exhibit effective vibration damping action when low-frequency, high amplitude vibration corresponding to engine shake has been input in the axial direction across the first mounting member 12 and the second mounting member 14. The tuning frequency of the choke passage 54 and the orifice passage 92 is understood to be the resonance frequency of fluid caused to flow through the choke passage 54 and the orifice passage 92. Tuning can be accomplished through proper setting of the ratio of passage length and passage cross sectional area of the choke passage 54 and the orifice passage 92.

With the partition member 60 installed housed within the fluid chamber 58, liquid pressure of the pressure receiving chamber 84 will act on a first face of the moveable rubber plate 66, while liquid pressure of the equilibrium chamber 86 will act on the other face. Then, on the basis of the relative pressure differential between the pressure receiving chamber 84 and the equilibrium chamber 86 the moveable rubber plate 66 will allow minor displacement and/or minor deformation in the axial direction. In the present embodiment, minor displacement of the moveable rubber plate 66 is realized through elastic deformation of the outside peripheral support portion 76 and the center support portion 78.

The automotive engine mount 10 of structure such as that above may be installed, for example, with the first mounting member 12 securely mounted onto the power unit of an automobile by passing a mounting bolt, not shown, through the bolt passage hole 22 of the first mounting member 12 and threading it into the power unit. Furthermore, the second mounting member 14 may be securely mounted onto the vehicle body via a tubular bracket 94 by bolting to the vehicle body a pair of mounting pieces provided to the tubular bracket 94 which has been secured fitting to the outside of the second mounting member 14, for example. In the above manner the automotive engine mount 10 pertaining to the present embodiment is installed between the power unit and the vehicle body of the automobile to provide vibration damped coupling of the power unit and the vehicle body through the engine mount 10.

With the engine mount 10 installed in the automobile, when vibration is input across the first mounting member 12 and the second mounting member 14 in the horizontal direction, i.e. the axis-perpendicular direction, a relative pressure differential will arise between the pair of liquid chambers 46, 46. Where the input vibration is low-frequency, high amplitude vibration corresponding to engine shake of the automobile, fluid flow will be produced through the choke passage 54 between the pair of liquid chambers 46, 46. Vibration damping action will be produced thereby based on the resonance effect or other flow effect of the fluid flowing through the choke passage 54.

When vibration is input across the first mounting member 12 and the second mounting member 14 in the vertical direction, i.e. the axial direction, internal pressure fluctuations will act on the pressure receiving chamber 84, creating a relative pressure differential between the pressure receiving chamber 84 and the equilibrium chamber 86. Where the input vibration is low-frequency, high amplitude vibration corresponding to engine shake of the automobile, fluid flow will be produced through the orifice passage 92 between the pressure receiving chamber 84 and the equilibrium chamber 86 based on the relative pressure differential between the two chambers 84, 86. Effective vibration damping action through high damping action will be produced thereby based on the resonance effect or other flow effect of the fluid flowing through the orifice passage 92, which has been tuned to a low-frequency band.

During input of low-frequency, high amplitude vibration, the moveable rubber plate 66 will become pushed against the inside wall to one side in the axial direction of the housing area which has been formed utilizing the housing recess 70, thereby stopping displacement. This in turn prevents absorption of liquid pressure through minor displacement of the moveable rubber plate 66 so that fluid flow through the orifice passage 92 will be advantageously produced. In the present embodiment in particular, several cushioning striker portions 80 which gradually constrict in width towards their projecting distal ends have been formed in the diametrically medial section of the moveable rubber plate 66, whereby striking of the moveable rubber plate 66 against the inside wall of the housing area can take place in a cushioned manner, and striking noise can be advantageously reduced.

In the event that vibration input in the axial direction is high-frequency, low-amplitude vibration which corresponds for example to muffled driving sound of the car, the relative pressure differential between the pressure receiving chamber 84 and the equilibrium chamber 86 will result in minor displacement of the moveable rubber plate 66 in the axial direction, and internal pressure fluctuations affecting the pressure receiving chamber 84 will escape to the equilibrium chamber 86 side. Based on the low dynamic spring action produced through this liquid pressure absorption action, at times of input of vibration in a high-frequency band as well, exceptional vibration damping capability will be realized through a vibration isolating action.

In the automotive engine mount 10 of structure according to the present embodiment, a retention region 95 serving as the dead water region is formed in the orifice passage 92. The pressure receiving chamber 84 end of the orifice passage 92 constitutes the communication hole 88 which extends at a right angle to the medial section constituted by the second peripheral groove 74, and thus the retention region 95 is produced by the corners of the connecting section of the medial section with the pressure receiving chamber 84 end of the orifice passage 92.

Specifically, where the sealed fluid has been positively induced to flow through the orifice passage 92, in the inflected section on the pressure receiving chamber 84 side of the orifice passage 92 the principal flow of the flowing fluid will not be able to flow along the wall surfaces of the orifice passage 92 but will instead separate from the wall surfaces. Thus, in the inflected section of the orifice passage 92 on its pressure receiving chamber 84 side, between the separation flow line (the double-dot dashed line in FIG. 8) and the orthogonal wall surfaces constituted by the bottom face and the terminal end face 93 of the orifice passage 92 there will be formed a vortex flow whereby the fluid experiences substantially no downflow in the direction of primary flow of the fluid (the flow direction of the fluid when positively induced to flow through the orifice passage 92 by the resonance effect), and will instead pool in the connecting corners of the second peripheral groove 74 and the communication hole 88, forming the retention region 95 (the light black area in FIG. 8).

It is thought that during sudden expansion or contraction of flow cross section within a pipe (in this case, the orifice passage 92), flow along the wall surface will not be possible, and the flow will instead separate from the wall surface at a separation point, creating an eddy region between the separation flow line and the stationary wall surface where the fluid will simply circle around without flowing down; and that the flow cross sectional area will be reduced by a corresponding amount. The eddy region downstream from this separation point is defined as the dead water region.

Figure 8:
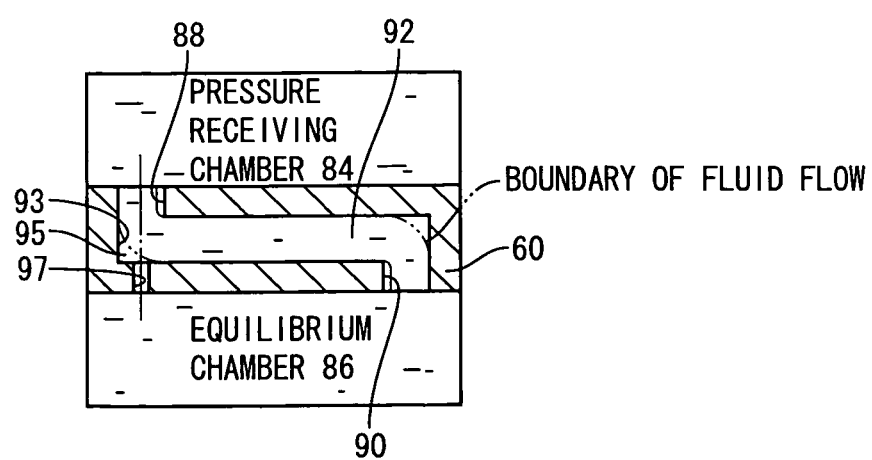
FIG. 8 is a schematic diagram of a principle part of the engine mount of FIG. 1.

In FIG. 8, the retention region 95 is clearly indicated by light black; and the boundaries of the flow region of the fluid (the inner and outer limits of the flow path) are indicated by the double-dot dashed lines. As will be apparent from the preceding discussion, in the retention region 95 there is substantially no inflow or outflow of fluid between the pressure receiving chamber 84 and the equilibrium chamber 86.

At the pressure receiving chamber 84 end of the orifice passage 92, there is provided a lower wall portion 96 as a bottom wall which constitutes part of the wall of the orifice passage 92. The lower wall portion 96 is disposed in a section which is part of the lower side wall of the second peripheral groove 74 on its pressure receiving chamber 84 end, and which overlaps the communication hole 88 when viewed axial projection on the wall of the orifice passage 92. That is, the lower wall portion 96 is the bottom wall portion of the section of the orifice passage 92 in which the retention region 95 is formed.

The lower wall portion 96 at a first face thereof faces into the pressure receiving chamber 84 through the communication hole 88, and at its other face is exposed directly into the equilibrium chamber 86 in the section lying away from the orifice passage 92. In other words, pressure within the pressure receiving chamber 84 will act via the communication hole 88 on the first face of the lower wall portion 96, while pressure inside the equilibrium chamber 86 will act directly on the other face of the lower wall portion 96.

Furthermore, a shunt hole 97 is formed in this lower wall portion 96, so as to open into the retention region 95. The shunt hole 97 is a circular passage hole which extends in a straight line in the axial direction; its cross sectional area is sufficiently smaller than that of the orifice passage 92 and the communication hole 88.

The shunt hole 97 is formed passing through the lower wall portion 96 of the second peripheral groove 74 which is part of the bottom wall of the orifice passage 92, at the first end of the second peripheral groove 74 which connects with the communication hole 88. The shunt hole 97 at a first opening thereof opens towards the retention region 95, while its other opening opens towards the equilibrium chamber 86. In other words, the shunt hole 97 at its first opening opens into the pressure receiving chamber 84 via the communication hole 88, and at its other opening opens directly into the equilibrium chamber 86.

Figure 3:
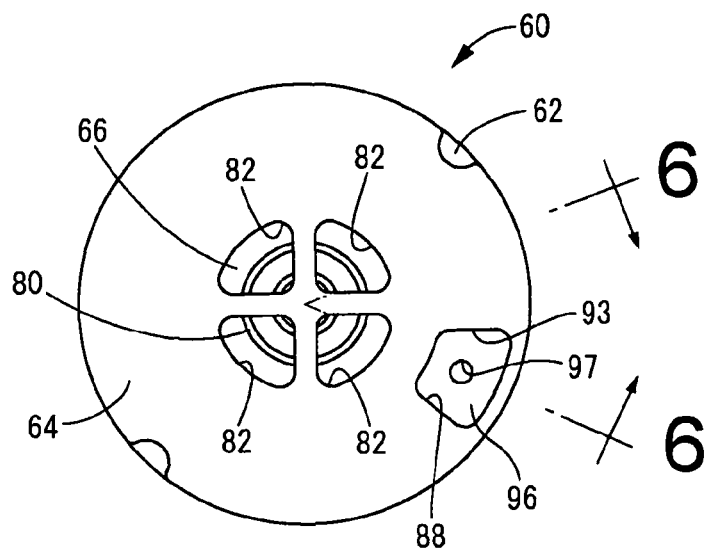
FIG. 3 is a top plane view of a partition member of the engine mount of FIG. 1.
Figure 4:
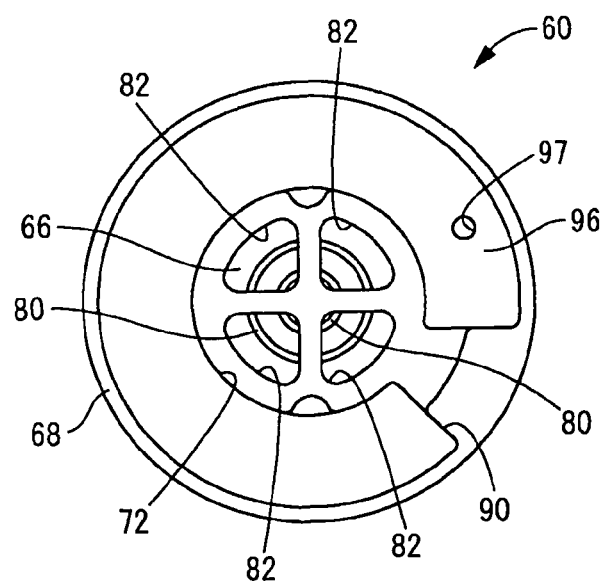
FIG. 4 is a bottom plane view of the partition member of FIG. 3.
Figure 5:
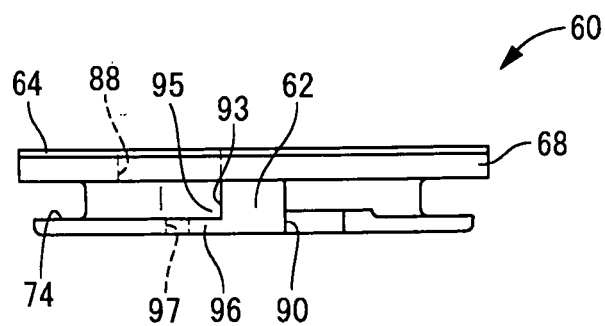
FIG. 5 is a side elevational view of the partition member of FIG. 3.
Figure 6:
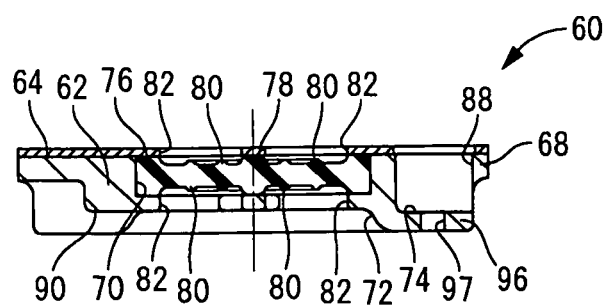
FIG. 6 is a cross sectional view taken along line 6-6 of FIG. 3.
Figure 7:
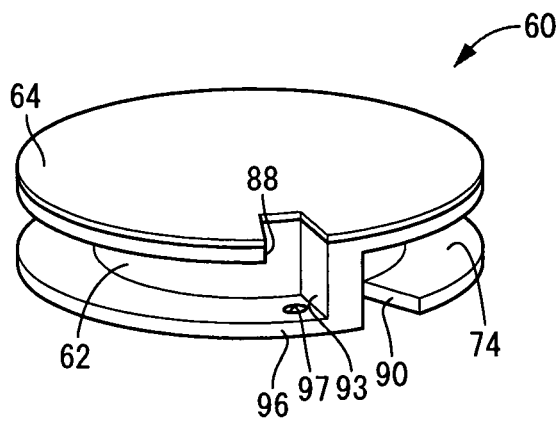
FIG. 7 is a schematic perspective view of the partition member of FIG. 3.

That is, as shown in FIGS. 3, 5, and 6, the shunt hole 97 is formed at a location facing the communication hole 88 in the axial direction; in the present embodiment, the shunt hole 97 is formed at a location in the approximate center of the communication hole 88 viewed in the axial direction.

In order to advantageously produce a state of being blocked off by the retention region 95, discussed later, it is preferable for the center axis of the shunt hole 97 to be situated between the terminal end face 93 and the lengthwise center of the orifice passage 92 within a region projected in the direction of the center axis of the communication hole 88 (the vertical direction in FIG. 6), onto the lower wall portion 96 which constitutes one of the orthogonal wall surfaces. In other words, on the lower wall portion 96, the center axis of the shunt hole 97 will preferably be positioned between the terminal end face 93 and the circumferential center within a region projected in the direction of the center axis of the communication hole 88. That is, in the present embodiment, it is preferable for the center axis of the shunt hole 97 to be situated on the center axis of the communication hole 88 indicated by the dot-and-dashed line in FIG. 8, or towards the left side in the drawing which is nearer to the terminal end face 93 side from the center axis. The region projected in the direction of the center axis of the communication hole 88 onto the lower wall portion 96 refers to the section which is visible through the communication hole 88 in FIG. 3.

Moreover, while in the present embodiment the shunt hole 97 has been formed so that it is situated in the center of the communication hole 88 as viewed in the axial direction, it sufficient that the opening of the shunt hole 97 on the pressure receiving chamber 84 side open into the retention region 95, and it may instead be formed at a location closer to the end wall face in the circumferential direction. The cross sectional area of the shunt hole 97 will preferably be equal to between about ½ and 1/100 of the cross section of the orifice passage 92, more preferably between about ⅕ and 1/50, and ideally between about 1/10 and 1/30. The diameter of the shunt hole 97 is preferably at least 2.5 mm and no more than 4 mm; in the present embodiment, the diameter of the shunt hole 97 is set at 3 mm.

The first end of the shunt hole 97 opens into the pressure receiving chamber 84 through the communication hole 88, while its other end opens into the equilibrium chamber 86, whereby the pressure receiving chamber 84 and the equilibrium chamber 86 communicate with one another through the shunt hole 97. The shunt hole 97 forms a shunt passage by which the pressure receiving chamber 84 and the equilibrium chamber 86 communicate with one another over a shorter passage length than the orifice passage 92.

In the engine mount 10 furnished with this shunt hole 97, in the event that a large impulsive load is input in the axial direction across the first mounting member 12 and the second mounting member 14 due to the vehicle being driven over a bump for example, this will generate flow of fluid between the pressure receiving chamber 84 and the equilibrium chamber 86 through the shunt passage (i.e. the shunt hole 97) which connects the chambers 84, 86 via a path which is shorter than the orifice passage 92. The relative pressure differential between the pressure receiving chamber 84 and the equilibrium chamber 86 will be dispelled or reduced as quickly as possible.

Thus, negative pressure acting on the pressure receiving chamber 84 can be reduced. The phenomenon of cavitation caused by separation of the gaseous phase from the non-compressible fluid which fills the pressure receiving chamber 84, as well as the noise and vibration associated with this phenomenon, can be advantageously reduced or avoided. Moreover, development of high dynamic spring due to excessive positive pressure acting on the pressure receiving chamber 84 can be prevented, and it will be possible to consistently achieve the desired vibration damping capabilities as well.

Figure 9:
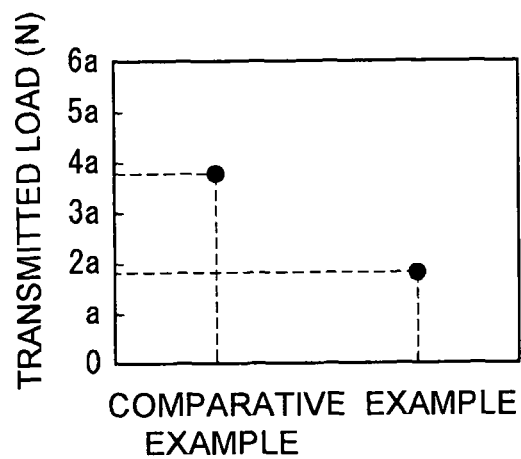
FIG. 9 is a graph showing measurements of noise level of engine mount of FIG. 1.

The effect of reduced noise and vibration afforded in the engine mount 10 of structure according to the present embodiment can be corroborated from the results of measurement of transmitted load shown in FIG. 9. Specifically, FIG. 9 gives measurements of transmitted load for an engine mount 10 pertaining to the present embodiment which is furnished with the shunt hole 97 (Example), and for an engine mount of conventional structure lacking the shunt hole 97 (Comparative Example), when identical vibration load was input. Here, an increase in measured transmitted load when a given vibration load was input is attributed to water hammer pressure produced by cavitation. Thus, the actual measurements also show that, in the example of the invention, the shock wave caused by cavitation is diminished in comparison with the comparative example of the conventional structure, and that the problems of noise and vibration caused by transmission of shock load to the passenger cabin can be ameliorated thereby.

Moreover, since the shunt hole 97 is formed opening into the retention region 95 of the orifice passage 92, at times of input of vibration targeted for damping, i.e. vibration of the frequency to which the orifice passage 92 has been tuned, the shunt hole 97 will be substantially blocked off, and fluid flow through the orifice passage 92 can be produced effectively.

Specifically, when vibration of frequency equal to the tuning frequency band of the orifice passage 92 is input, as illustrated in FIG. 8, in regions apart from the retention region 95 of the orifice passage 92 the fluid will be induced to flow through the orifice passage 92 positively and actively at a sufficiently fast flow rate. When this flow of fluid which flows at a sufficiently fast flow rate through the orifice passage 92 due to the resonance effect arrives at the pressure receiving chamber 84 end of the orifice passage 92 which is inflected at a right angle, the flow will then separate from the wall surfaces of the orifice passage 92 thereby producing the retention region 95 between the fluid flow and the wall surfaces of the orifice passage 92. Since this retention region 95 is produced above the opening of the shunt hole 97 on the pressure receiving chamber 84 side, the opening of the shunt hole 97 on the pressure receiving chamber 84 side will be substantially blocked off, and there will be substantially no fluid flow through the shunt hole 97 between the pressure receiving chamber 84 and the equilibrium chamber 86.

In particular, the shunt hole 97 communicates with the pressure receiving chamber 84 through the pressure receiving chamber 84 end of the orifice passage 92, while communicating directly with the equilibrium chamber 86, whereby the shunt hole 97 will be advantageously maintained in the blocked state when vibration targeted for damping by the orifice passage 92 is input. Specifically, under conditions of input of vibration targeted for damping by the orifice passage 92, it will be difficult for liquid pressure within the pressure receiving chamber 84 to act against the retention region 95 which has been formed at the side opposite from the pressure receiving chamber 84, of the flow of fluid flowing through the orifice passage 92. Accordingly, the state of formation of the retention region 95 will be maintained consistently, and the shunt hole 97 will be effectively placed in the substantially blocked state.

Herein, the condition of shunt hole 97 being substantially blocked off, or of substantially no fluid flow through the shunt hole 97, refers to a condition in which the amount of fluid flow through the shunt hole 97 is sufficiently small to ensure fluid flow through the orifice passage 92; this would include a condition in which fluid flow through the shunt hole 97 is of an extent causing no problem in terms of achieving the desired vibration damping action, as well as to a condition in which the shunt hole 97 is substantially blocked off or a condition in which there is substantially no fluid flow through the shunt hole 97, as described in the present embodiment.

In other words, with the orifice passage 92 in the resonance state, flow resistance of the orifice passage 92 will be markedly depressed, and fluid flow through the orifice passage 92 will be produced positively. The retention region 95 is formed to the side opposite from the pressure receiving chamber 84 of the flow of fluid flowing through the orifice passage 92; and the shunt hole 97 opens into the retention region 95. In this way, the opening of the shunt hole 97 on the pressure receiving chamber 84 side opens into the pressure receiving chamber 84 at a location away from the flow in the resonance state through the orifice passage 92, so that with the orifice passage 92 in the resonance state, liquid pressure in the pressure receiving chamber 84 will not easily act on the shunt hole 97, and flow resistance will increase. Accordingly, the amount of fluid flow through the shunt hole 97 will be reduced or substantially eliminated.

In the engine mount 10 pertaining to the present embodiment, in the event that vibration targeted for damping by the orifice passage 92 has been input, the resultant liquid pressure within the pressure receiving chamber 84 will be prevented from escaping into the equilibrium chamber 86 through the shunt hole 97, and a sufficient amount of fluid flow through the orifice passage 92 can be assured. Accordingly, high damping action based on flow effect of the fluid induced to flow through the orifice passage 92 can be effectively achieved.

Figure 10:
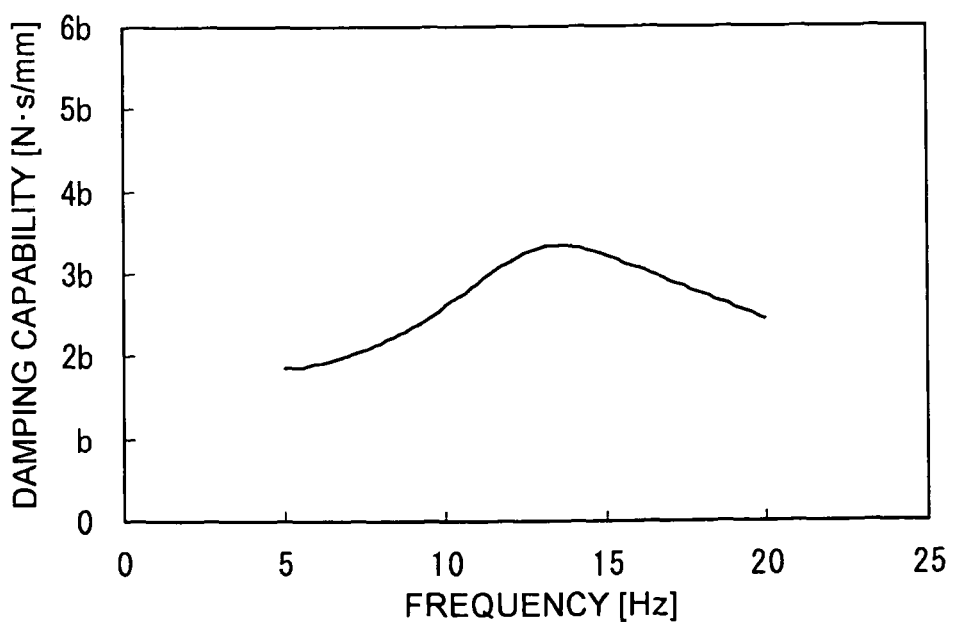
FIG. 10 is a graph showing measurements of damping capability of the engine mount of FIG. 1.

FIG. 10 depicts actual measurements of damping capability against vibration input in the axial direction in the engine mount 10 pertaining to the present embodiment. In the embodiment, damping action of 3 b (N·s/mm) or above, which is necessary in terms of vehicle characteristics, was effectively achieved thereby. From these actual measurements it is clear that, in the fluid filled type vibration damping device pertaining to the present invention, effective vibration damping action can be achieved despite the presence of the shunt hole 97.

In the automotive engine mount 10 of structure according to the present embodiment, by noting the positive fluid flow through the orifice passage 92 created in instances where vibration load of frequency equal to the turning frequency band has been input, the retention region 95 has been deliberately formed in a specific region on the orifice passage 92. Then, by skillfully utilizing this retention region 95, there has been produced what is essentially valve means for switching the shunt hole 97 between the communicating state and the blocked state. Both the desired vibration damping capability and reduced cavitation noise are effectively achieved thereby through switching of the shunt hole 97 between the communicating state and the blocked state, without the need for any special valve parts.

Specifically, when a load targeted for damping of frequency equal to the frequency to which the orifice passage 92 has been pre-tuned is input, the shunt hole 97 will assume the substantially blocked state and the retention region 95 can be utilized to effectively obtain the desired high damping action. On the other hand, at times of input of large impulsive load, fluid will be induced to flow through the shunt hole 97 between the chambers 84, 86 thereby preventing a sharp rise or drop in pressure inside the pressure receiving chamber 84, so that the problem of noise and vibration, or of diminished vibration damping capability, can be eliminated.

Where, for example, a shunt hole has been formed passing through the partition member in its diametrical center section which is a section situated away from the orifice passage extending along the outside peripheral edge, it will not be possible for a retention region which utilizes fluid flow through the orifice passage as described above to be formed over the opening of the shunt hole on the pressure receiving chamber side, and thus the shunt hole will always be in the communicating state. For this reason, liquid pressure within the pressure receiving chamber will escape into the equilibrium chamber through the shunt hole, even at times when vibration targeted for damping by the orifice passage has been input. Accordingly, with such a structure, even if a reduction in cavitation noise is achieved it will not be possible to effectively achieve the desired vibration damping action concomitantly, and the effects afforded by the present invention will not be sufficiently achieved.

While the present invention has been described hereinabove through a preferred embodiment, this is merely illustrative and the present invention should not be construed as limited in any way to the specific disclosure of the embodiment.

For example, the shape of the cross section of the shunt hole 97 need not be circular. Moreover, it is not necessary for the shape of the cross section to be unchanging over its entire length; it may instead have a tapered inside peripheral face which flares out gradually towards either end. Moreover, whereas in the preceding embodiment a single shunt hole 97 was formed, it would be acceptable to form multiple shunt holes 97. For example, a plurality of small-diameter circular holes could be formed at the pressure receiving chamber 84 end of the orifice passage 92. Where multiple shunt holes 97 are formed, the total cross sectional area of the multiple shunt holes 97 will be smaller than the cross sectional area of the orifice passage 92.

The partition member 60 shown in the preceding embodiment merely illustrates one example of a specific structure for the partition member, and should not be construed as limiting in any way.

Figure 11:
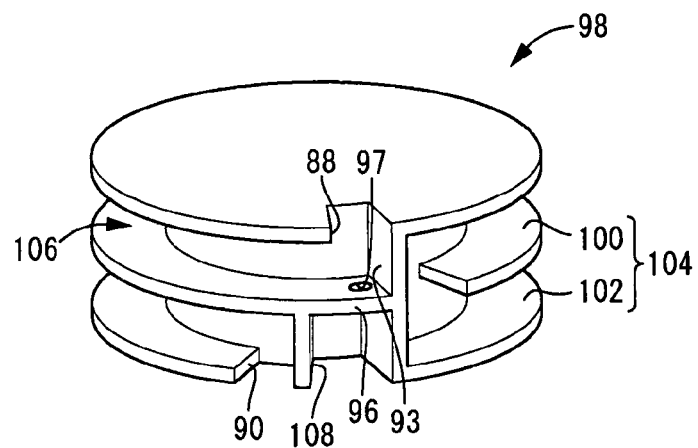
FIG. 11 is a schematic perspective view of a partition member of an engine mount according to a second embodiment of the present invention.

Specifically, a partition member 98 like that shown in FIG. 11 could be employed for example. In more detail, the partition member 98 has an upper tier peripheral groove 100 which opens onto the outside peripheral face and extends through it by a distance just short of once around the circumferential direction. At a first open end in the circumferential direction of this upper tier peripheral groove 100 there is formed a communication hole 88 which extends in straight line passing through the upper wall. A lower tier peripheral groove 102 is formed on the outside peripheral edge of the partition member 98, a prescribed distance away below the upper tier peripheral groove 100 in the axial direction. Like the upper tier peripheral groove 100, the lower tier peripheral groove 102 opens onto the outside peripheral face of the partition member 98 and extends through it by a distance just short of once around the circumferential direction; and a communication portion 90 which passes through the lower wall is formed at a first end in the circumferential direction.

The upper tier peripheral groove 100 and the lower tier peripheral groove 102 connect to one another at their other circumferential ends, thereby constituting a peripheral groove 104 which overall doubles back in the medial section and extends a distance just short of twice around in the circumferential direction. Like the partition member 60 of the preceding embodiment, the partition member 98 is inserted into and secured fitting within the second mounting member 14 thereby fluidtightly covering the outside peripheral opening of the peripheral groove 104 with the second mounting member 14 and, utilizing the peripheral groove 104, the communication hole 88 and the communication portion 90, forming an orifice passage 106 which extends a distance just short of twice around in the circumferential direction and interconnects the pressure receiving chamber 84 and the equilibrium chamber 86.

Here, a communication recess 108 which opens into the equilibrium chamber 86 is formed in the lower wall portion 96 at a first circumferential end of the upper tier peripheral groove 100. This communication recess 108 has greater cross sectional area than the shunt hole 97 and the communication hole 88, and the region to the inner peripheral side of the communication recess 108 constitutes a substantial part of the equilibrium chamber 86. By forming the communication recess 108, the wall thickness of the lower wall portion 96 is reduced at the pressure receiving chamber 84 end of the orifice passage 106. The shunt hole 97 will then be formed in this thin the lower wall portion 96, so that the shunt hole 97 communicates with the pressure receiving chamber 84 through the communication hole 88 and with the communication recess 108 which constitutes part of the equilibrium chamber 86. As shown in FIG. 11, the lower tier peripheral groove 102 is formed in a section away from the area where the communication recess 108 has been formed.

Figure 12:
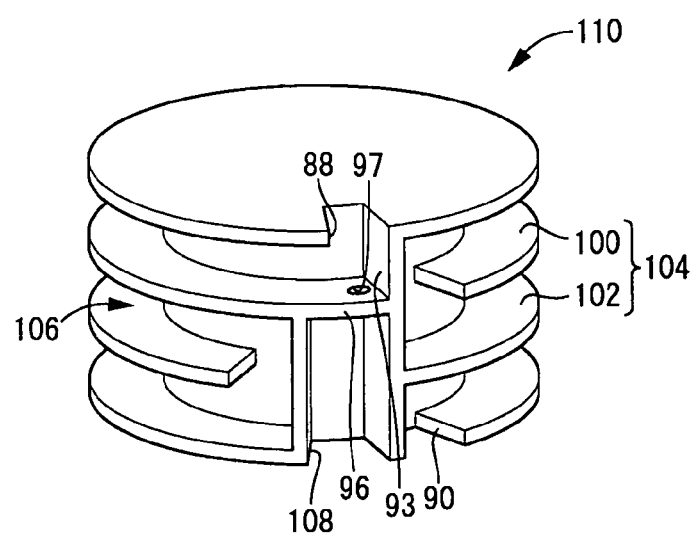
FIG. 12 is a schematic perspective view of a partition member of an engine mount according to another embodiment of the present invention.

A partition member 110 like that depicted in FIG. 12 could also be employed for example. In comparison with the partition member 98 shown in FIG. 11, in this partition member 110 the lower tier peripheral groove 102 doubles back in the circumferentially medial section and extends for a length just short of twice around in the circumferential direction, so that the orifice passage 106 is formed with a length equal to twice around or more in the circumferential direction.

With a fluid filled type vibration damping device furnished with a partition member 98, 110 of the structure illustrated in FIG. 11 or 12, it is possible to effectively achieve both the desired vibration damping capabilities when ordinary vibration targeted for damping is input, and a reduction in or elimination of cavitation noise during input of large impulsive load. In the discussion of the structures illustrated in FIGS. 11 and 12, parts and regions substantially identical to those in the preceding embodiment have been assigned the same symbols as in the embodiment and are not discussed in any detail. The partition members 98, 110 shown in FIGS. 11 and 12, like the partition member 60 shown in the preceding embodiment, is employed in a fluid filled type vibration damping device such as an automotive engine mount, and is installed so as to partition the pressure receiving chamber 84 and the equilibrium chamber 86.

In the partition members 98, 110 illustrated in FIGS. 11 and 12 the thickness of the lower wall portion 96 at the pressure receiving chamber 84 end of the orifice passage 106 is reduced through formation of the communication recess 108, reducing the weight of the partition members 98, 110. Furthermore, by forming the shunt hole 97 so that it opens into the communication recess 108, it is possible to avoid unnecessarily long passage length of the shunt hole 97.

That is, it is sufficient that the orifice passage to be formed so as to extend for a length equal to once around the circumference or more; in this case the lower wall portion 96 of the orifice passage 92, 106 at a first face thereof will face directly into the pressure receiving chamber 84 through the communication hole 88, while the other face will face directly into the equilibrium chamber 86 in the section thereof away from the orifice passage 92, 106, through the communication recess 108 etc., and the shunt hole 97 formed passing through the lower wall portion 96 will open on the wall surfaces which respectively face the pressure receiving chamber 84 and the equilibrium chamber 86.

In the preceding embodiment, an engine mount 10 of a structure furnished with a pair of liquid chambers 46, 46 which are formed in opposition in the axis-perpendicular direction, and with an orifice member 48 having formed therein a choke passage 54 for interconnecting the liquid chambers 46, 46, for the purpose of advantageously affording vibration damping action against vibration input in the axis-perpendicular direction is shown by way of one class of fluid filled type vibration damping device which pertains to the present invention. However, the liquid chambers 46, 46 and the choke passage 54 for the purpose of effective vibration damping action against vibration input in the axis-perpendicular direction are not essential elements in the fluid filled type vibration damping device which pertains to the present invention. Specifically, the present invention could also be implemented in a fluid filled type vibration damping device of ordinary structure such as shown in FIG. 1 of JP 6-105095 B for example, which has as non-compressible fluid-filled regions a pressure receiving chamber and an equilibrium chamber pair which are formed to either side of a partition member, and which has an orifice passage connecting the pressure receiving chamber with the equilibrium chamber.

Furthermore, whereas in the preceding embodiment the second mounting member 14 is fastened onto the outside of the intermediate sleeve 24 which has been vulcanization bonded to the outside peripheral face of the main rubber elastic body 16, the second mounting member 14 could instead be vulcanization bonded directly to the main rubber elastic body 16. Furthermore, in the partition member, the moveable rubber plate 66 or other liquid pressure absorption mechanism may be selected appropriately depending on the vibration damping capabilities required, and liquid pressure absorption devices of different structure could be provided, or the liquid pressure absorption device could be eliminated.

While the orifice passage 92 in the preceding embodiment extends in the circumferential direction, the orifice passage need not necessarily extend in the circumferential direction. Specifically, it could instead extend in a straight line in the diametrical direction, or extend in a spiral pattern. Furthermore, in the orifice passage 92 the entire medial section thereof is formed as to extend within the plane of extension of the partition member 60; however, it is sufficient for at least the pressure receiving chamber 84 end of the orifice passage which is the connecting section thereof with the communication hole 88 to extend within the plane of extension of the partition member 60, and the medial section of the passage may have sections which extend in the axial direction, or a direction inclined towards the axial direction. Herein, the direction of the plane of extension of the partition member 60 refers to the axis-perpendicular direction in the embodiment, that is, the direction of the horizontal plane of extension of the partition member 60 which divides the pressure receiving chamber 84 and the equilibrium chamber 86, or in other words the direction perpendicular to the direction of opposition of the pressure receiving chamber 84 and the equilibrium chamber 86 which are situated in opposition to either side of the partition member 60.

It is also to be understood that the present invention may be embodied with various other changes, modifications and improvements, which may occur to those skilled in the art, without departing from the spirit and scope of the invention defined in the following claims.

What is claimed is:

1. A fluid filled vibration damping device comprising:
  a first mounting member;
  a second mounting member having a tubular section so that the first mounting member is positioned at an opening at a first end of the second mounting member;
  a main rubber elastic body elastically connecting the first mounting member and the second mounting member together with the opening at the first end of the second mounting member fluid-tightly closed by the main rubber elastic body while an opening at another end of the second mounting member is fluid-tightly closed by a flexible film so as to form between opposed faces of the main rubber elastic body and the flexible film in a region to an inner peripheral side of the second mounting member a fluid chamber which is isolated from an outside space and filled with a non-compressible fluid;
  a partition member disposed within the fluid chamber while being supported by the second mounting member so as to divide the fluid chamber into a pressure receiving chamber whose wall is partially constituted by the main rubber elastic body, and an equilibrium chamber whose wall is partially constituted by the flexible film; and
  an orifice passage formed in the partition member to connect the pressure receiving chamber and the equilibrium chamber together,
  wherein a first end section of the orifice passage extends in a direction of a plane of extension of the partition member, and a first communication hole is formed so as to bend at a right angle from the first end section of the orifice passage and open towards the pressure receiving chamber so that the first end section of the orifice passage communicates with the pressure receiving chamber through the first communication hole, while a second communication hole is formed through a bottommost wall of the partition member at a second end section of the orifice passage and opens towards the equilibrium chamber,
  wherein at a pressure receiving chamber-side opening section in the orifice passage, a terminal end face of the orifice passage rises up at a right angle with respect to a direction of extension of the orifice passage, in order to form a dead water region by orthogonal wall faces of the terminal end face and a bottom face of the orifice passage in a connecting corner section of the orifice passage with the first communication hole,
  wherein a bottom wall of the first end section of the orifice passage, which constitutes one of the orthogonal wall faces of the dead water region, faces at a first face thereof directly to the pressure receiving chamber through the first communication hole, while facing at another face thereof directly to the equilibrium chamber at a portion away from the orifice passage, and
  wherein a shunt hole of smaller cross-sectional area than the orifice passage and the first communication hole is formed in the bottom wall of the first end section of the orifice passage so that a first opening of the shunt hole opens towards the pressure receiving chamber via the dead water region while a second opening of the shunt hole opens into the equilibrium chamber, the second opening of the shunt hole being separated from the second communication hole of the orifice passage in a circumferential direction of the partition member.

2. The fluid filled vibration damping device according to claim 1, wherein in the bottom wall in the first end section of the orifice passage which makes up the orthogonal wall faces of the dead water region, a center axis of the shunt hole is positioned between the terminal end face and a lengthwise center of the orifice passage within the projected area of the first communication hole in a direction of the center axis thereof.

3. The fluid filled vibration damping device according to claim 2, wherein the center axis of the shunt hole is situated on a center axis of the first communication hole, or nearer to a side of the terminal end face from the center axis of the first communication hole.

4. The fluid filled vibration damping device according to claim 1, wherein the orifice passage is formed so as to extend a length equivalent to an entire circumference thereof or less in a circumferential direction of an outside peripheral section of the partition member, and at a first circumferential end section of the orifice passage, the first communication hole is formed so as to pass through a wall of the orifice passage on a pressure receiving chamber side and the shunt hole is formed so as to pass through a wall of the orifice passage on an equilibrium chamber side.

5. The fluid filled vibration damping device according to claim 1, wherein an upper tier peripheral groove is provided so as to extend through an outside peripheral section of the partition member by a distance equivalent to an entire circumference thereof or less in a circumferential direction, the upper tier peripheral groove being formed with the first communication hole passing through a wall on a pressure receiving chamber side in a first circumferential end section of the upper tier peripheral groove and, while being formed with a communication recess opening towards an equilibrium chamber side in a wall on the equilibrium chamber side in the first circumferential end section of the upper tier peripheral groove to reduce a wall thickness on the equilibrium chamber side to form the shunt hole at this location, and
  wherein a lower tier peripheral groove is formed in an area closer towards the equilibrium chamber side from the upper tier peripheral groove in the outside peripheral section of the partition member, and the lower tier peripheral groove makes a U-turn at another circumferential end section of the upper tier peripheral groove and extends in the circumferential direction through an area equivalent to an entire circumference thereof or less in the circumferential direction away from an area where the communication recess has been formed, with an end section of the lower tier peripheral groove communicating with the equilibrium chamber so that the upper tier peripheral groove and the lower tier peripheral groove form the orifice passage.

6. The fluid filled vibration damping device according to claim 1, wherein a cross sectional area of the shunt hole is equal to between $\frac{1}{2}$ and $\frac{1}{100}$ of a cross section of the orifice passage.

7. A fluid filled vibration damping device comprising:
a first mounting member;
a second mounting member having a tubular section so that the first mounting member is positioned at an opening at a first end of the second mounting member;
a main rubber elastic body elastically connecting the first mounting member and the second mounting member together with the opening at the first end of the second mounting member fluid-tightly closed by the main rubber elastic body while an opening at another end of the second mounting member is fluid-tightly closed by a flexible film so as to form between opposed faces of the main rubber elastic body and the flexible film in a region to an inner peripheral side of the second mounting member a fluid chamber which is isolated from an outside space and filled with a non-compressible fluid;
a partition member disposed within the fluid chamber while being supported by the second mounting member so as to divide the fluid chamber into a pressure receiving chamber whose wall is partially constituted by the main rubber elastic body, and an equilibrium chamber whose wall is partially constituted by the flexible film; and
an orifice passage formed in the partition member to connect the pressure receiving chamber and the equilibrium chamber together,
wherein a first end section of the orifice passage extends in a direction of a plane of extension of the partition member, and a first communication hole is formed so as to bend at a right angle from the first end section of the orifice passage and open towards the pressure receiving chamber so that the first end section of the orifice passage communicates with the pressure receiving chamber through the first communication hole, while a second communication hole is formed through a bottommost wall of the partition member at a second end section of the orifice passage and opens towards the equilibrium chamber,
wherein at a pressure receiving chamber-side opening section in the orifice passage, a terminal end face of the orifice passage rises up at a right angle with respect to a direction of extension of the orifice passage, in order to form a dead water region by orthogonal wall faces of the terminal end face and a bottom face of the orifice passage in a connecting corner section of the orifice passage with the first communication hole,
wherein a bottom wall of the first end section of the orifice passage, which constitutes one of the orthogonal wall faces of the dead water region, faces at a first face thereof directly to the pressure receiving chamber through the first communication hole, while facing at another face thereof directly to the equilibrium chamber at a portion away from the orifice passage, and
wherein a shunt hole of smaller cross-sectional area than the orifice passage and the first communication hole is formed in the bottom wall of the first end section of the orifice passage so that a first opening of the shunt hole opens towards the pressure receiving chamber via the dead water region while a second opening of the shunt hole opens into the equilibrium chamber, and the shunt hole is formed at a location where the first opening of the shunt hole faces the first communication hole of the orifice passage in an axial direction of the partition member and where the second opening of the shunt hole does not face the second communication hole of the orifice passage in the axial direction of the partition member.

* * * * *